(12) United States Patent  
Watanabe et al.

(10) Patent No.: US 7,352,961 B2  
(45) Date of Patent: Apr. 1, 2008

(54) WATERPROOF HOUSING COMPATIBLE FOR A PLURALITY OF CAMERAS

(75) Inventors: Shinichi Watanabe, Kawaguchi (JP); Koji Funahashi, Tokorozawa (JP)

(73) Assignee: Olympus Corporation, Tokyo (JP)

( * ) Notice: Subject to any disclaimer, the term of this patent is extended or adjusted under 35 U.S.C. 154(b) by 122 days.

(21) Appl. No.: 10/887,447

(22) Filed: Jul. 8, 2004

(65) Prior Publication Data

US 2006/0008262 A1 Jan. 12, 2006

(51) Int. Cl.  
*G03B 17/08* (2006.01)

(52) U.S. Cl. .......................... 396/27; 348/81; 348/373

(58) Field of Classification Search ................ 348/81; 396/25, 27, 29; 206/316.2  
See application file for complete search history.

(56) References Cited

U.S. PATENT DOCUMENTS

| | | | | | |
|---|---|---|---|---|---|
| 2,944,474 | A | * | 7/1960 | Dennis | 396/27 |
| 3,019,715 | A | * | 2/1962 | Arnold et al. | 396/27 |
| 3,241,467 | A | * | 3/1966 | Young | 396/27 |
| 3,412,661 | A | * | 11/1968 | Soumar | 396/27 |
| 3,860,937 | A | * | 1/1975 | Wolfe | 396/27 |
| 6,128,441 | A | * | 10/2000 | Kamata et al. | 396/25 |

\* cited by examiner

*Primary Examiner*—W. B. Perkey  
*Assistant Examiner*—Rishi Suthar  
(74) *Attorney, Agent, or Firm*—Straub and Pokotylo; John C. Pokotylo

(57) ABSTRACT

A system includes a plurality of cameras and a waterproof housing. The plurality of cameras include a first camera including a first operating member, a second camera including a second operating member which is superposed to the position of the first operating member in the waterproof housing upon storing the second camera in the waterproof housing. The waterproof housing can store whichever one of the first camera and the second camera. The waterproof housing includes a third operating member and a fourth operating member. The third operating member operates the first operating member upon storing the first camera in the waterproof housing, and the fourth operating member operates the second operating member upon storing the second camera.

26 Claims, 9 Drawing Sheets

WATERPROOF HOUSING COMPATIBLE FOR A PLURALITY OF CAMERAS

BACKGROUND OF THE INVENTION

1. Field of the Invention

The present invention relates to the structure of a waterproof housing for storing each of a plurality of cameras.

2. Description of the Related Art

Conventionally, a waterproof housing for camera storage has been produced on a commercial basis for the purpose of underwater photography. The waterproof housing includes two case members which are supported to be opened and closed by a hinge. When the camera is attached to the waterproof housing, the two case members are closed and sealed so as to store the camera. In the camera storing state, the camera is variously operated from the outside of the waterproof housing.

Among the above-mentioned conventional waterproof housings for camera storage, one stores only a single type of camera. For example, a single waterproof-housing is not suggested and is not produced on the commercial basis to store a plurality of cameras having different specifications of an operating button.

SUMMARY OF THE INVENTION

Accordingly, the present invention provides a system comprising a plurality of cameras having different specifications of an operating method of an operating member and a waterproof housing having varied operating members depending on the cameras.

According to one aspect of the present invention, a system comprises a plurality of cameras and a waterproof housing compatible for the cameras. The plurality of cameras comprise a first camera comprising a first operating member, a second camera comprising a second operating member which is superposed to the position of the first operating member in the waterproof housing upon storing the second camera in the waterproof housing. The waterproof housing comprises a third operating member and a fourth operating member. The third operating member operates the first operating member upon storing the first camera in the waterproof housing, and the fourth operating member operates the second operating member upon storing the second camera.

According to another aspect of the present invention, a waterproof housing for camera storage comprises a first camera stored therein comprising a first operating member, a second camera stored therein comprising a second operating member which is superposed to the position of the first operating member in the waterproof housing, a third operating member which operates the first operating member when the waterproof housing stores the first camera, and a fourth operating member which operates the second operating member when the waterproof housing stores the second camera.

Other features and advantages of the present invention will be obvious by the following.

DESCRIPTION OF THE PREFERRED EMBODIMENTS

Hereinbelow, an embodiment of the present invention will be described with reference to the drawings.

A waterproof housing 1 according to the embodiment of the present invention can photograph and play an image underwater when a camera is stored therein. Referring to FIGS. 1 to 4, operating members of the camera are externally exposed. A first camera 60 and a second camera 70 as a plurality of cameras shown in FIGS. 5 and 6 can be stored in the waterproof housing 1. A waterproof housing/camera system is structured by the first and second cameras 60 and 70 and the waterproof housing 1 according to the embodiment.

The first and second cameras 60 and 70 have the substantially same outer dimensions. However, the specifications of the first camera 60 is partly different from that of the second camera 70. According to the embodiment, a power switch portion is different as a part of the camera operating portion.

Hereinafter, an optical axis O denotes a photographing lens optical axis of the stored camera, and the Z direction denotes the direction in parallel with the optical axis O of the camera stored in the waterproof housing 1. The direction perpendicular to the optical axis O in the right and left directions is an X-direction, the right direction viewed from the rear side is (+X)-direction, and the left direction viewed from the rear side is (−X)-direction. The right and left directions are viewed from the rear side.

Figure 5:
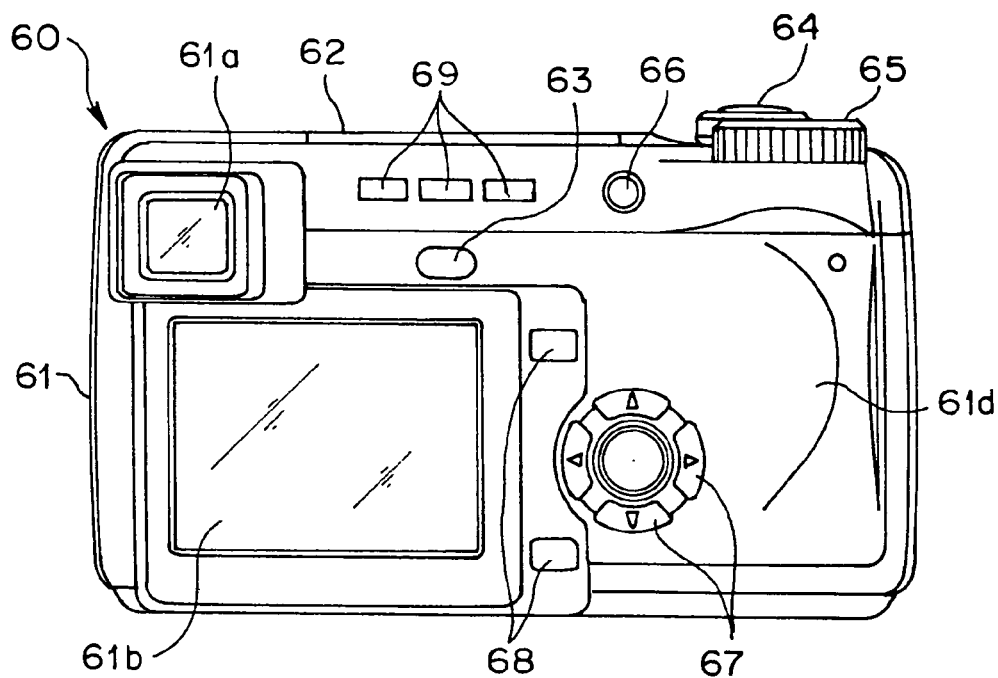
FIG. 5 is a rear view showing a first camera as one of a plurality of cameras which are stored in the waterproof housing shown in FIG. 1.

First, a description is given of a plurality of cameras which are stored in the waterproof housing 1. Referring to FIG. 5, the first camera 60 comprises a lens barrel portion 61c which holds a photographing lens at an exterior front portion (refer to FIG. 9). Further, the first camera 60 comprises a zoom button/release button 64 and a mode selecting dial 65 near the right side of an exterior top portion, and furthermore comprises a strobe light-emitting portion 62 which can be popped up, in the center of the exterior top portion. In addition, the first camera 60 comprises on the rear face a finder window 61a on the upper left side and a LCD display portion 61b near the left side. On the top of the rear portion, the first camera 60 further comprises mode selecting buttons 69, e.g., a self-timer button and a forced strobe light emitting button, and a pop-up button 66 which pops up the strobe light-emitting portion 62. In the center of the rear portion, the first camera 60 further comprise a power switch button 63, as a first operating member (press button), which switches on/off a power switch that can be pressed to the top of the LCD display portion 61b. In the center of the rear surface, the first camera 60 further comprises a selecting cross key 67 and mode setting buttons 68 of a mode such as quick viewing. On the right side of the rear surface, the first camera 60 comprises a grip portion 61d.

Figure 6:
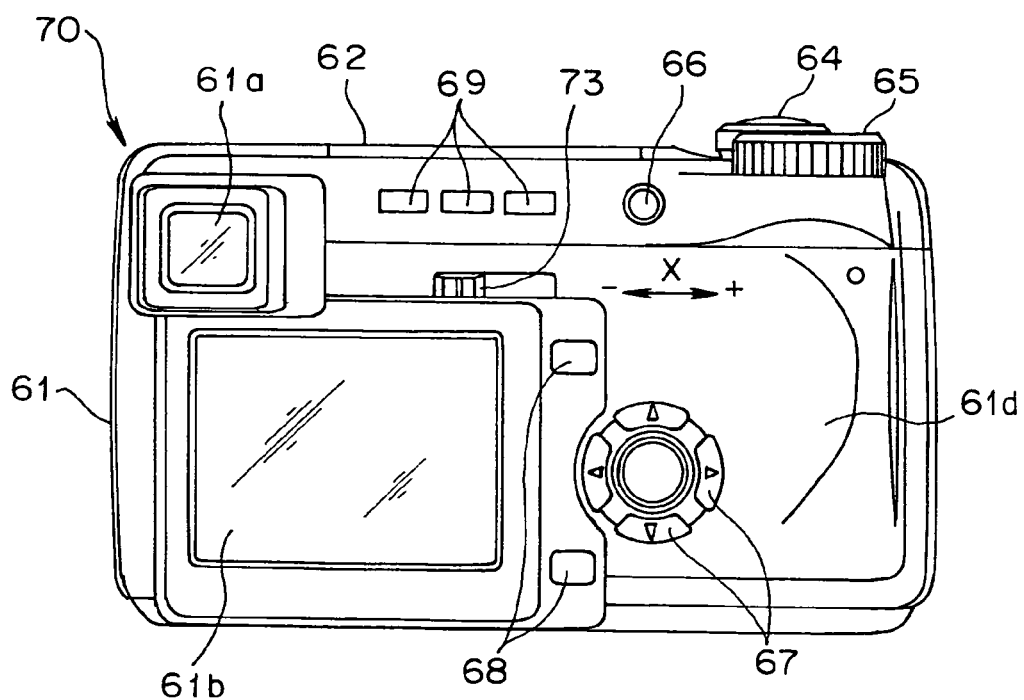
FIG. 6 is a rear view showing a second camera as another camera of the plurality of cameras which are stored in the waterproof housing shown in FIG. 1.

Referring to FIG. 6, similarly to the first camera 60, the second camera 70 comprises: the lens barrel portion 61c at the exterior front portion; the zoom button/release button 64 and the strobe light-emitting portion 62 on the exterior top portion; and the finder window 61a and the mode setting buttons 68 on the rear portion. Unlike the first camera 60, the second camera 60 comprises a power switch knob 73, as a second operating member (slide knob), which can be slid to the top of the LCD display portion 61b in the center of the rear portion. The power switch knob 73 is slidably moved to four positions in the X-direction so as to switch modes and turn on a power switch.

Among the four positions, the first position nearest to the side in the (−X)-direction is for turning off the power switch and is the same as the arrangement position of the power switch button 63 of the first camera 60. That is, when the first camera 60 is stored in the waterproof housing 1, the first position is superposed to the position of the power switch button 63. The second position on the right side of the first position as the next position in the (+X)-direction is a switch operating position for switching the camera to a play mode when the power switch is turned on. Further, the third position on the right side of the second position as the next position in the (+X)-direction is a switch operating position for switching the camera to the still image photographing mode when the power switch is turned on. The fourth position as the nearest position to the side in the (+X)-direction is a switch operating position for switching the camera to the moving image photographing mode when the power switch is turned on.

Referring to FIGS. 1 to 4, the waterproof housing 1 comprises a front case 2 and a rear case 3 which are made from transparent resin and are supported by hinge shaft members 4 and 5 arranged on the right surface so as to be opened and closed and be rotated. The front case 2 and the rear case 3 store the camera 60 or 70 and are closed with buckles 6 and 7 arranged on the left surface to be sealed. In the sealing state, the front case 2 and the rear case 3 are adhered thereto via a ring packing 8 to which a rear case groove 3a is attached on the junction surface so as to keep the watertight state without space.

At the inner circumference, the front case 2 has ribs 2d and 2e which, without any space in between the front or rear case, hold outer shape portions on the top, bottom, right, and left sides of the stored first camera 60 or second camera 70. Further, the front case 2 and the rear case 3 inside having a plurality of projections (not shown), three or more respectively, fixedly having rubbers at the edge portion projected in the Z-direction so as to fix the optical axis O direction of the stored camera. In the camera storing state, the first and second cameras 60 and 70 are supported without air gap among the ribs 2d and 2e and the projections.

The operating members for operating the camera arranged to the waterproof housing 1 are shared with the first and second cameras 60 and 70, except for operating members for the power switch button 63 and the power switch knob 73. Therefore, the arrangement of the operating member for operating the camera will be described commonly with the first and second cameras 60 and 70.

Figure 3:
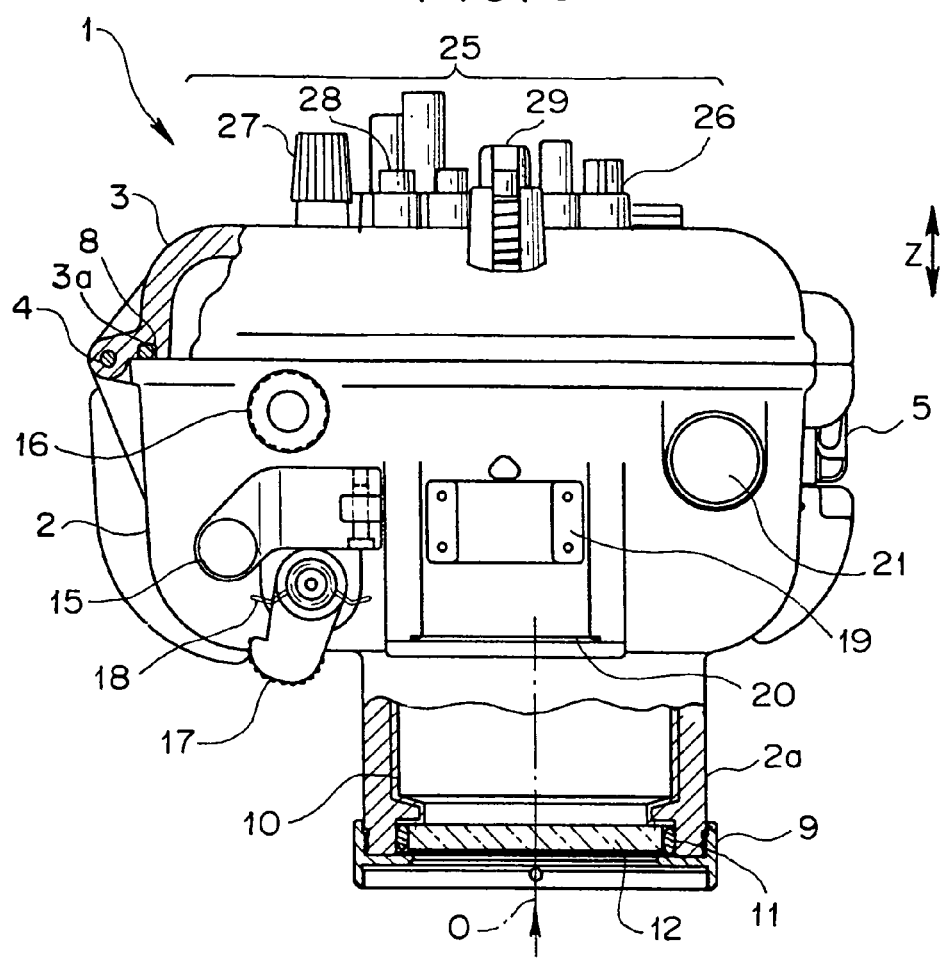
FIG. 3 is a plan view showing the waterproof housing shown in FIG. 1.

In the front of the front case 2, a strobe window portion is arranged so as to attach and detach a diffusion plate 20 and a cylindrical portion 2a (refer to FIG. 9) into which the lens barrel portion 61c of the first camera 60 or second camera 70 is inserted. Referring to FIG. 3, a cylindrical shading rubber member 10 is attached to the cylindrical portion 2a along the inner circumference and a protecting glass 12 shielded and held by an O ring 11 is attached to the opening of the front of the front case 2. Further, an attachment ring 9 is fixed to the front end portion of the front case 2.

Figure 1:
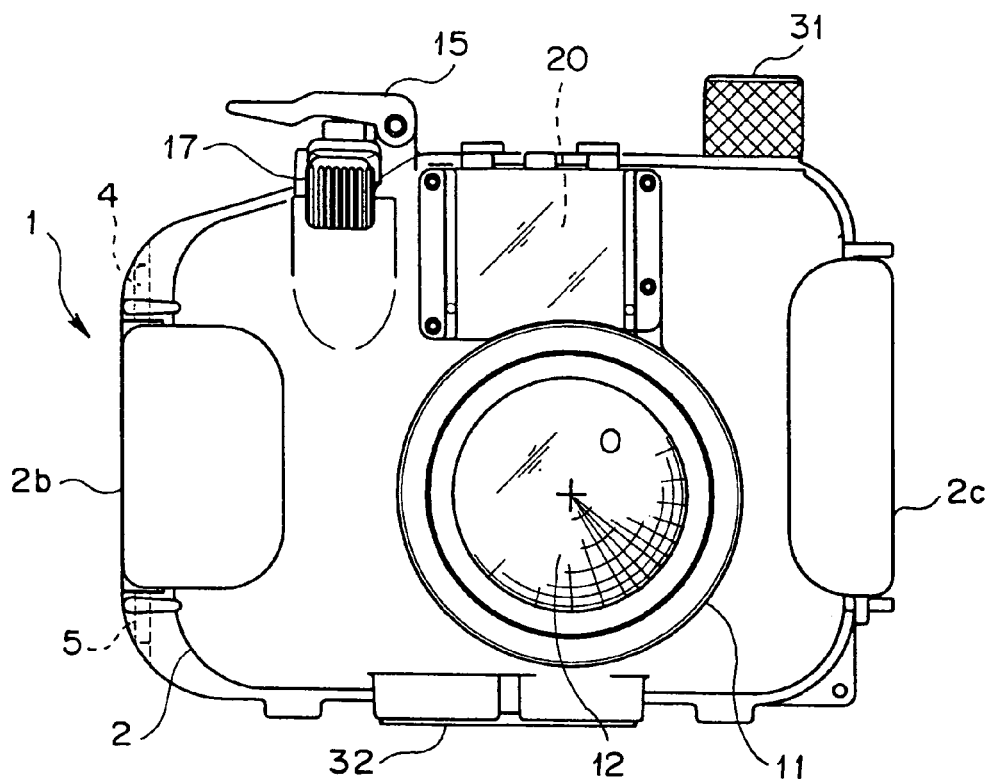
FIG. 1 is a front view showing a waterproof housing according to an embodiment of the present invention.
Figure 2:
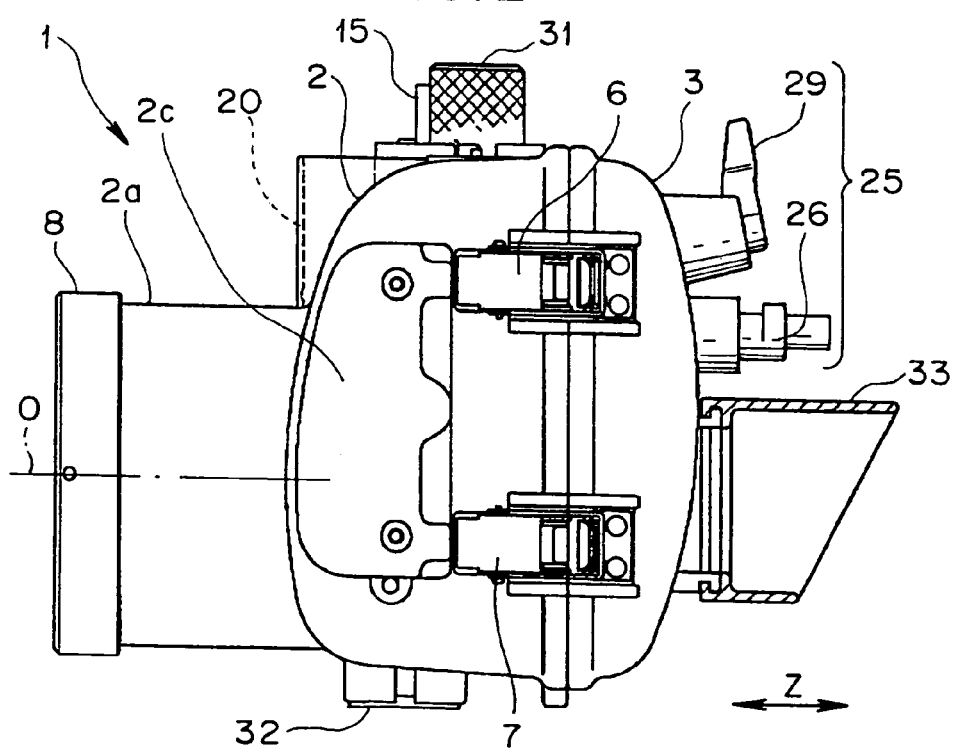
FIG. 2 is a side view showing the waterproof housing shown in FIG. 1.

Referring to FIGS. 2 and 3, the top surface portion of the front case 2 comprises: a release lever 15 and a zoom lever 17 having a return spring 18 in accordance with a zoom button/release button 64 on the camera side; a mode selection operating member 16 in accordance with a mode selecting dial 65 on the camera side; a cap member 21 of a connecting terminal for an external strobe; and an external strobe shoe 19.

Further, grip members 2c and 2d are fixed on the right and left sides of the front case 2. A plate 32 for tripod screw is fixed to the bottom portion of the front case 2.

Figure 4:
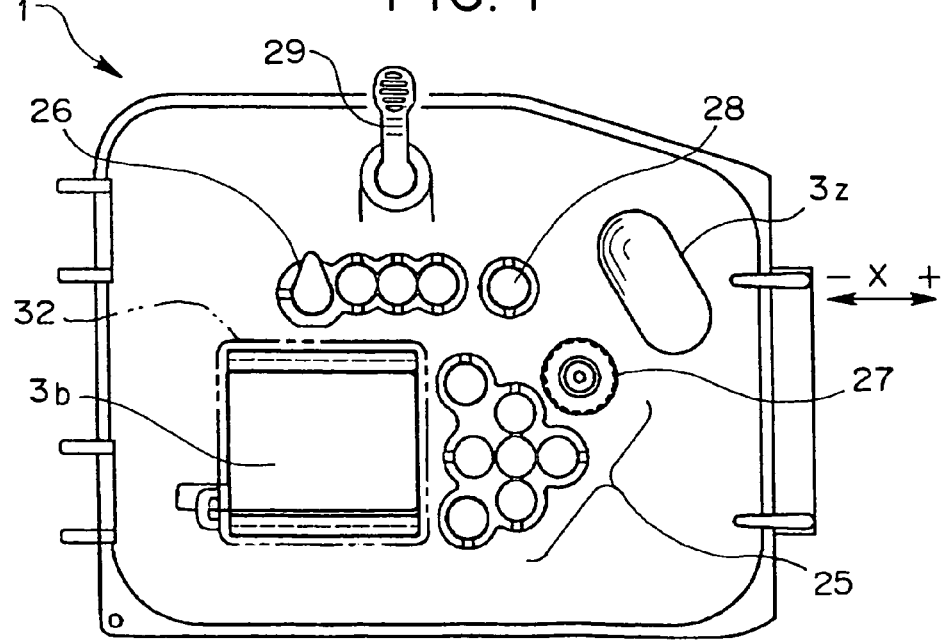
FIG. 4 is a diagram showing an operating portion that is arranged to the rear portion of the waterproof housing shown in FIG. 1.

Referring to FIG. 4, the rear case 3 comprises, on the rear portion, a display window portion 3b to which a hood 33 can be attached at the position facing the LCD display portion 61b on the camera side. Further, the rear case 3 comprises, on the rear portion, operating members 25 at positions facing operating buttons of the camera 60. Furthermore, the rear case 3 comprises, on the right and upper side of the rear portion, a caved grip portion 3z.

The above-mentioned operating members 25 attached to the front case 2 and the rear case 3 pierces to be rotated or slid therein. Sealing O rings are fit into the rotating portions or sliding portions of the front case 2 and the rear case 3 so as to keep the sealing (watertight) state.

Among the operating members 25, a pop-up member 28 as an operating member pushes a pop-up button 66 on the camera side and moves the strobe light-emitting portion 62 to the pop-up position (in other words, light-emitting position). Furthermore, among the operating members 25, a restoring member 29 of the light-emitting portion presses the strobe light-emitting portion 62 from the rear side and returns it to the restoring position as the non light-emitting position.

Among the operating members 25, a press power switch operating member 26 includes a rod. The press power switch operating member 26 is a third operating member (pressing member) which can be slid in the axial direction and can be rotated around the axis of the rod at a predetermined angle. When the press power switch operating member 26 is at a predetermined rotating position for the operation, the power switch button 63 of the stored first camera 60 can be pressed. Simultaneously, the press power switch operating member 26 limits the rotation of the power switch operating member 27, which will be described later. When the press power switch operating member 26 is held at a predetermined non-operation rotating position by the click, the power switch button 63 is not pressed and the sliding movement due to the rotation of the sliding power switch operating member 27 is allowed. The detailed structure and operation of the press power switch operating member 26 will be described later.

Among the operating members 25, a slide power switch operating member 27 is a fourth operating member which can be rotated at a predetermined angle, and can slide the power switch knob 73 of the second camera 70 stored by rotating a knob portion of the power switch operating member 27. The detailed structure and operation of the slide power switch operating member 27 will be described after.

Figure 7:
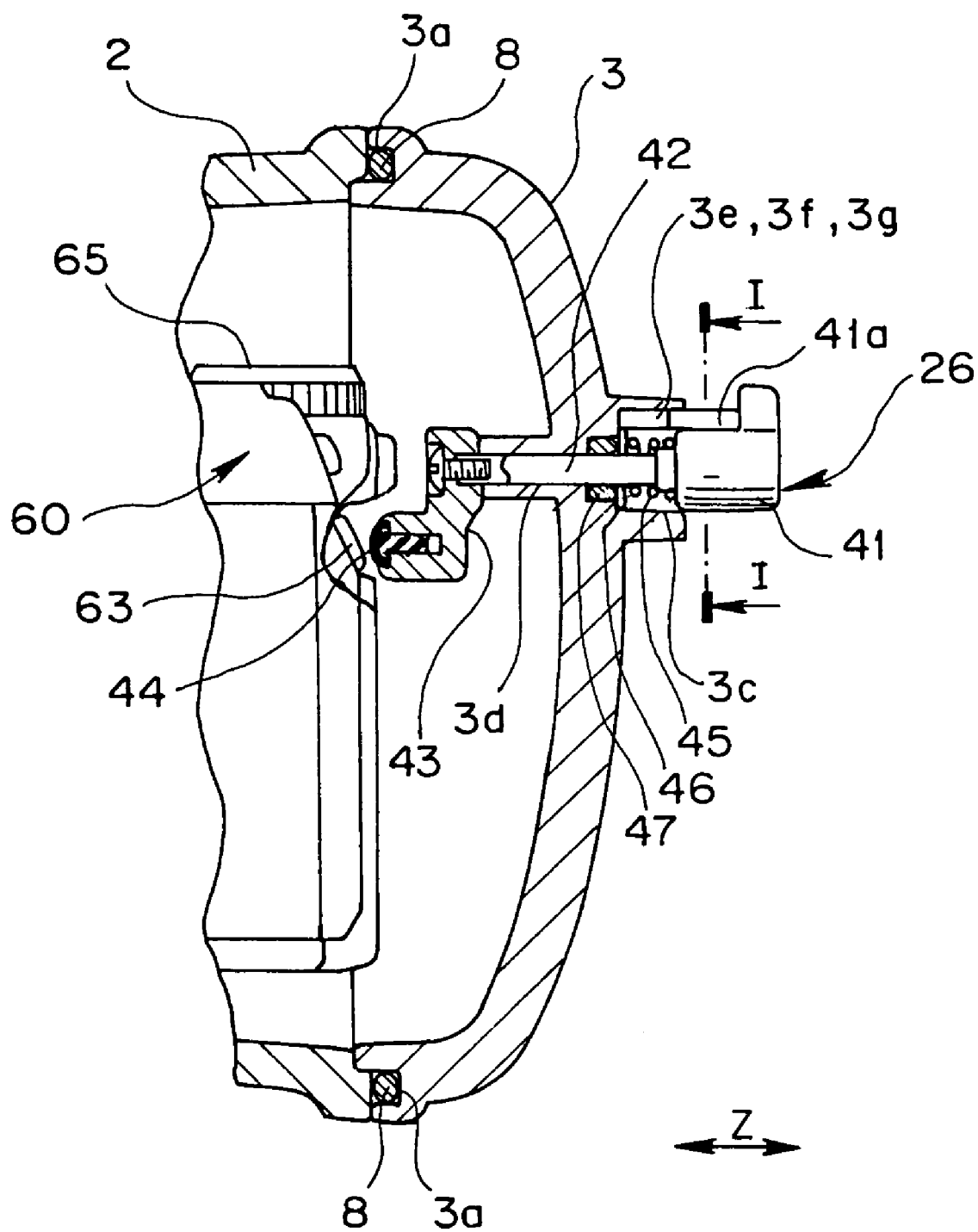
FIG. 7 is a partially longitudinal cross-sectional view showing a press power switch operating portion upon storing the first camera in the waterproof housing shown in FIG. 1.
Figure 9:
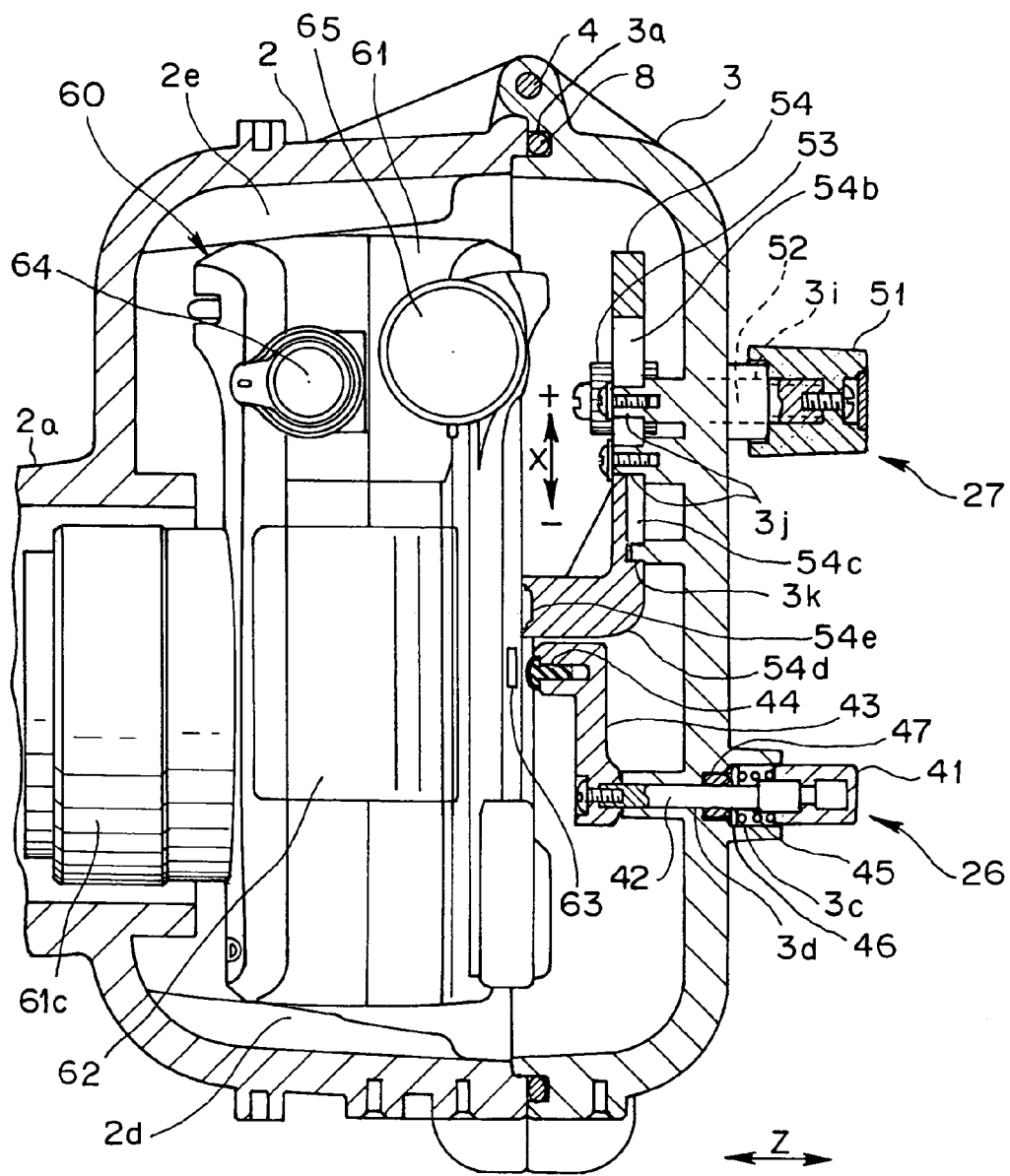
FIG. 9 is a lateral cross-sectional view showing the arrangement of two power switch operating portions upon storing the first camera in the waterproof housing shown in FIG. 1.

Referring to FIGS. 7 and 9, the press power switch operating member 26 comprises: a press button 41; a rod 42; an arm 43; an abutting rubber 44; and a return spring 45.

Figure 10:
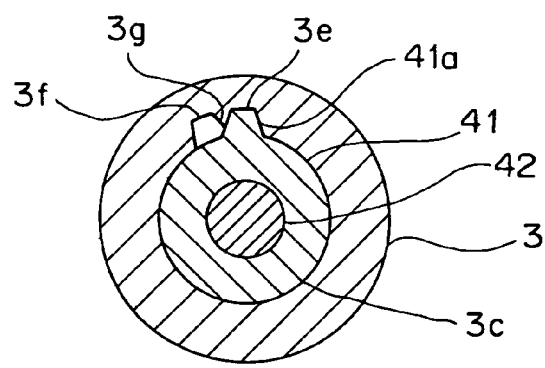
FIG. 10 is a I-I cross-sectional view of FIG. 7.

The press button 41 is integrated with the rod 42 having a circular cross-section (e.g., circular stick) by inserting and shaping them. The press button 41 has a projected portion 41a which is fit to a fitting opening 3c of the rear case 3 to be rotated at a predetermined angle and to be pressed and slid in the integrating state. Referring to FIG. 10, the fitting opening 3c comprises caved portions 3e and 3f for fitting the projected portion 41a. A click projected portion 3g which is minute for click operation is arranged as non-operating holding means between the caved portions 3e and 3f.

The rod 42 integral with the press button 41 pierces through the through hole 3d and are attached along the Z-direction from the fitting opening 3c while the return spring 45 is attached to the rod 42. An O ring 47 for sealing inserted in a groove of the rear case 3 is pressed by a press washer 46 in the piercing state of the rod 42 and further the O ring 47 for sealing is fit into the outer circumference of the rod 42. Therefore, a gap between the rod 42 and the through hole 3d is (watertightly) sealed and the rod 42 is supported to the through hole 3d to be rotated and slid.

The arm 43 is fixed by a screw to the edge portion of the case in the rod 42. Further, the abutting rubber 44 is fixed to the edge of the arm 43. The return spring 45 applies the energizing force to the press button 41 fixedly having the rod 42 and thus the position in the releasing direction of the press button 41 is determined as the stop position in the axial direction by the arm 43.

Figure 8:
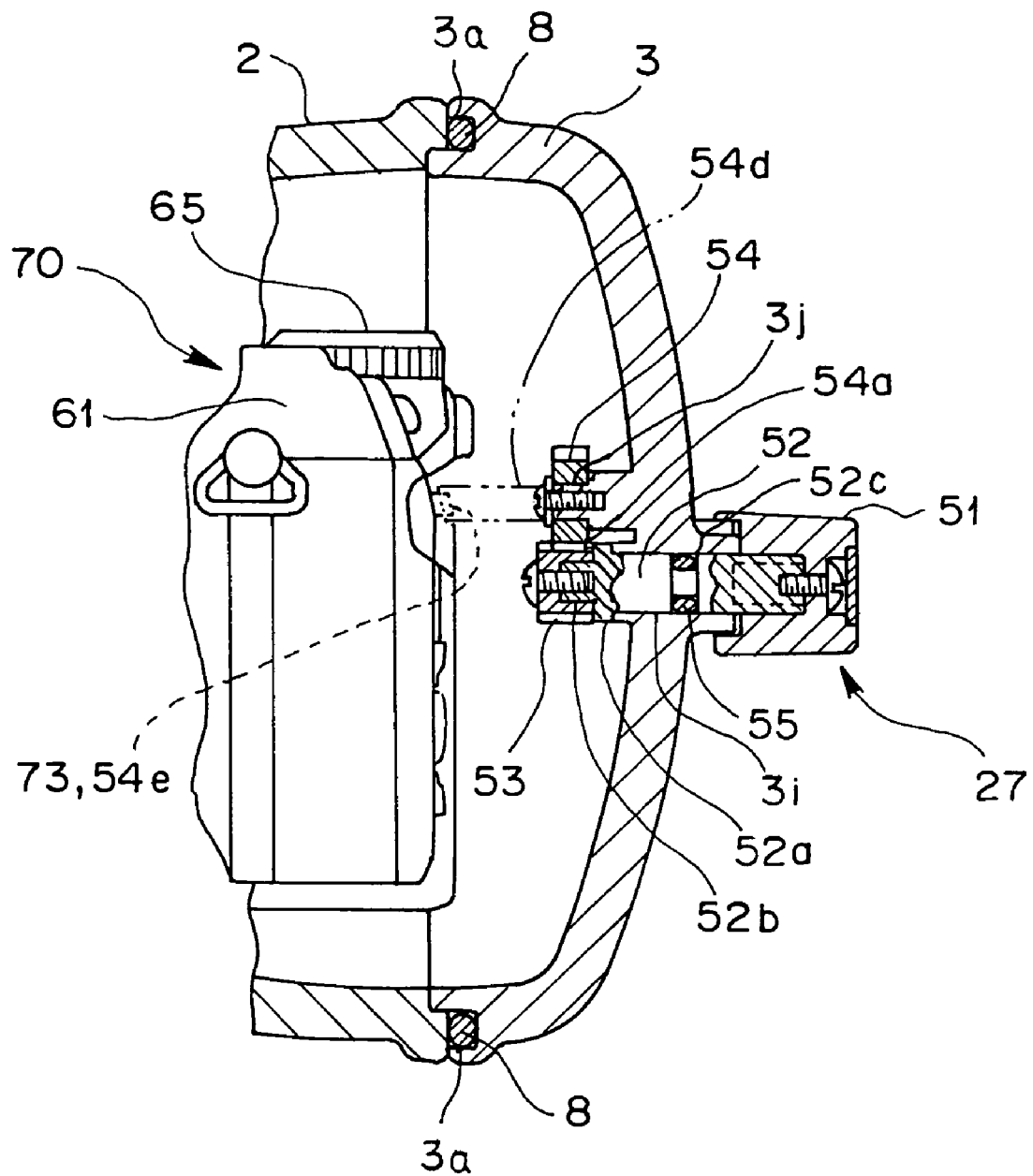
FIG. 8 is a partially longitudinal cross-sectional view showing a slide power switch operating portion upon storing the second camera in the waterproof housing shown in FIG. 1.
Figure 11:
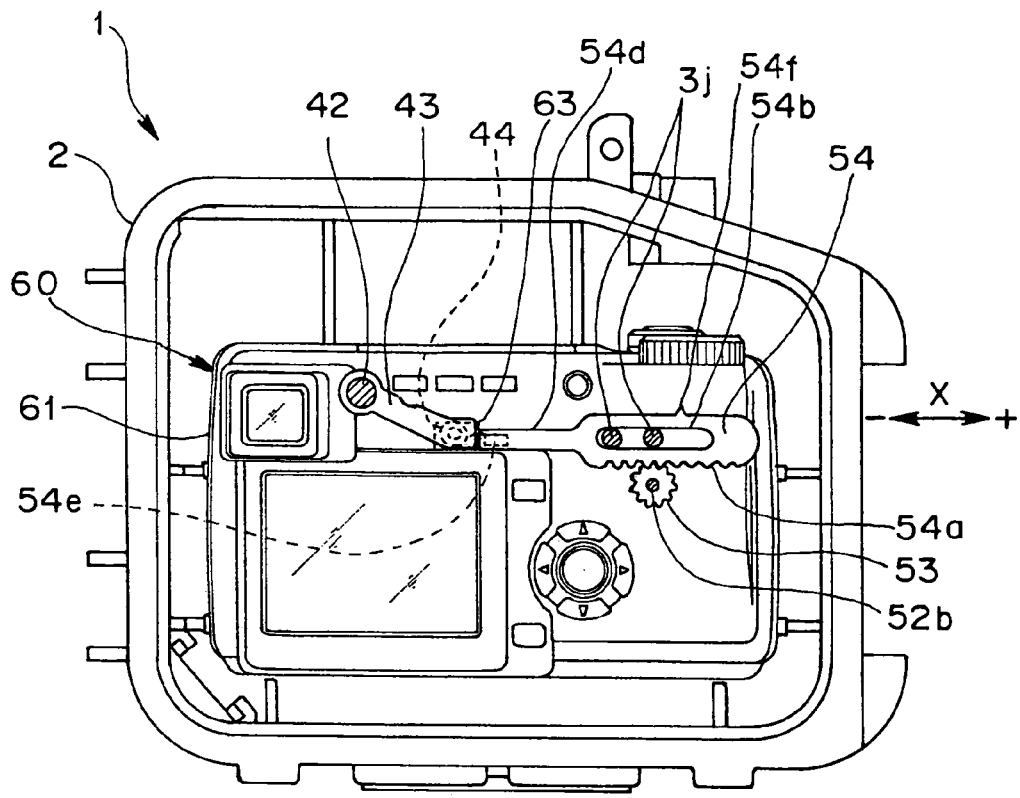
FIG. 11 is a view showing, from the rear side, the storage of the first camera in the waterproof housing shown in FIG. 1 and showing the operation of the power switch using the press power switch operating portion.

Referring to FIGS. 8, 9, and 11, the slide power switch operating member 27 comprises: a rotate knob 51; a rod 52; a pinion 53; and a slide member 54 as a linear movement member.

A screw fixes the rotate knob 51 to the rear end portion of the rod 52. The rod 52 pierces through a through hole 3i of the rear case 3 and is attached along the Z-direction. An O ring 55 for sealing is attached to a groove 52c of the rod 52, and is inserted to a piercing and fitting portion of the rod 52. The rod 52 is rotatably supported by a front step portion 52a and the rotate knob 51 while the movement in the axial direction is limited and, further, is rotatably (and watertightly) supported to the through hole 3i of the rear case 3. The pinion 53 is fixed by a screw to a front edge portion 52b of the rod 52.

Referring to FIG. 11, the slide member 54 comprises: a rack portion 54a and a guide groove portion 54b arranged along the X-direction; a top projected portion 54f as a mark of the sliding position; and an operating portion 54d which is projected on the side in the (−X)-direction. The operating portion 54d comprises: a guide groove portion 54c along the X-direction; and a slide knob fitting caved portion 54e at the position bent and projected on the front side. Two guide pin portions 3j of the rear case 3 are slidably fit into the guide groove 54b. A guide pin portion 3k of the rear case 3 is slidably fit into the guide groove portion 54c. A power switch knob 73 of the stored second camera 70 is fit into the slide knob fitting caved portion 54e.

The slide member 54 is slidably supported in the X-direction by the three pins of the two guide pin portions 3j and the guide pin portion 3k. Further, the moving range of the slide member 54 in the (+X)-direction is limited by the guide pin portion 3k. Furthermore, the moving range of the slide member 54 in the (−X)-direction is limited by the guide pin portions 3j.

Next, a description is given of the switch change-over operation of the first and second cameras 60 and 70 by using the power switch operating members 26 and 27 with the above-mentioned structure.

When the first camera 60 is stored in the waterproof housing 1, the rotating knob 51 of the power switch operating member 27 is rotated, the slide member 54 is moved in the (+X)-direction, and the press button 41 of the power switch operating member 26 is rotated to the click position at which the projected portion 41a is fit into the caved portion 3e. In this state, the first camera 60 is stored in the waterproof housing 1 and then, referring to FIGS. 9 and 11, the abutting rubber 44 at the edge of the arm 43 faces the power switch button 63 of the stored first camera 60 in the releasing state of the press button 41 and the abutting rubber 44 is apart from the power switch button 63. Then, the press button 41 is pressed against the energizing force of the return spring 45, thus, the power switch button 63 is pressed, and the power switch is switched on/off.

When the projected portion 41a of the press button 41 is at the click position where it is fit into the caved portion 3e and the power switch button 63 can be pressed as mentioned above, the edge of the arm 43 is at the locking position for prohibiting (limiting) the movement of the power switch operating member 27, and functions as locking means. Referring to FIG. 11, the edge of the arm 43 is abutted on the operating portion 54d of the slide member 54 on the power switch operating member 27 side, the slide member 54 is limited (locked) so as to prevent the slide operation of the slide member 54 in the (−X)-direction, and the power switch operating member 27 is held to be non-operated.

On the other hand, when the second camera 70 is stored in the waterproof housing 1, the press button 41 of the power switch operating member 26 is rotated, the projected portion 41a is fit into the caved portion 3f, and the click operation of the projected portion 41a is held by the click projected portion 3g. This click holding operation enables the power switch operating member 26 to be held to be non-operated so that the second camera 70 is stored in the waterproof housing 1 and the power switch operating member 26 is apart from the position of the power switch knob 73. The power switch operating member 27 rotates the rotate knob 51 and moves the slide member 54 to the position that is the nearest to the (−X)-direction side (first position in FIG. 12). Further, the power switch knob 73 on the second camera 70 side is slid to the position that is the nearest to the (−X)-direction side (off position of the power switch). In the above-mentioned state, the second camera 70 is stored in the waterproof housing 1.

Figure 12:
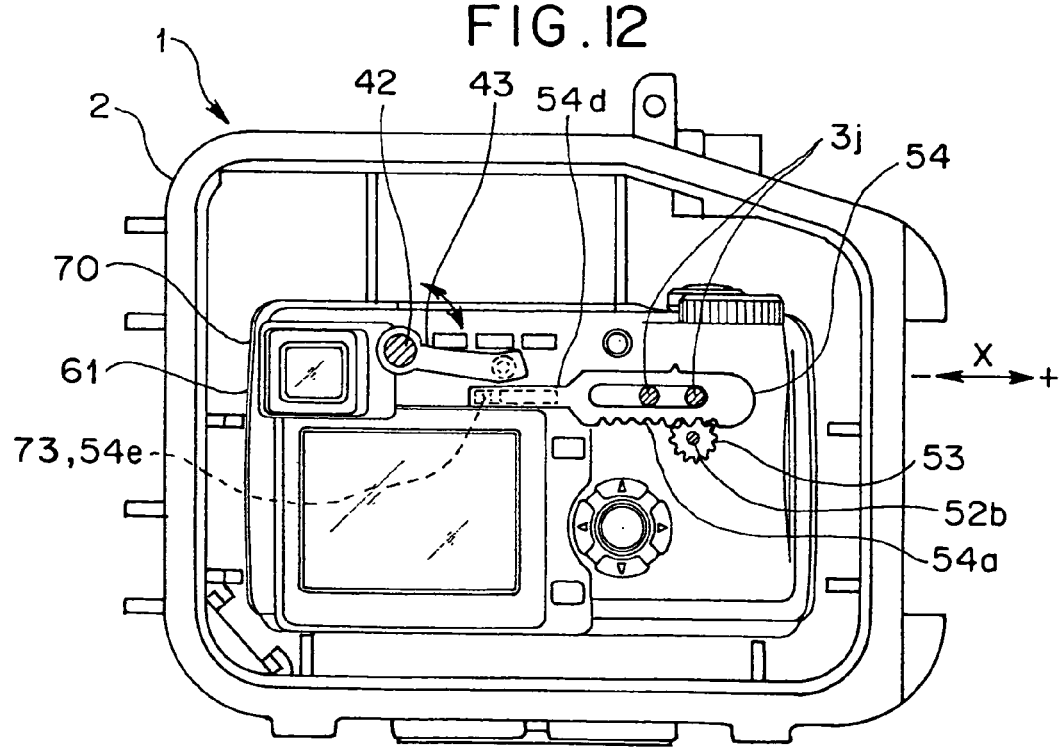
FIG. 12 is a view showing, from the rear side, the storage of the second camera in the waterproof housing shown in FIG. 1 and showing the operation (off-power) of the power switch using the slide power switch operating portion.
Figure 13:
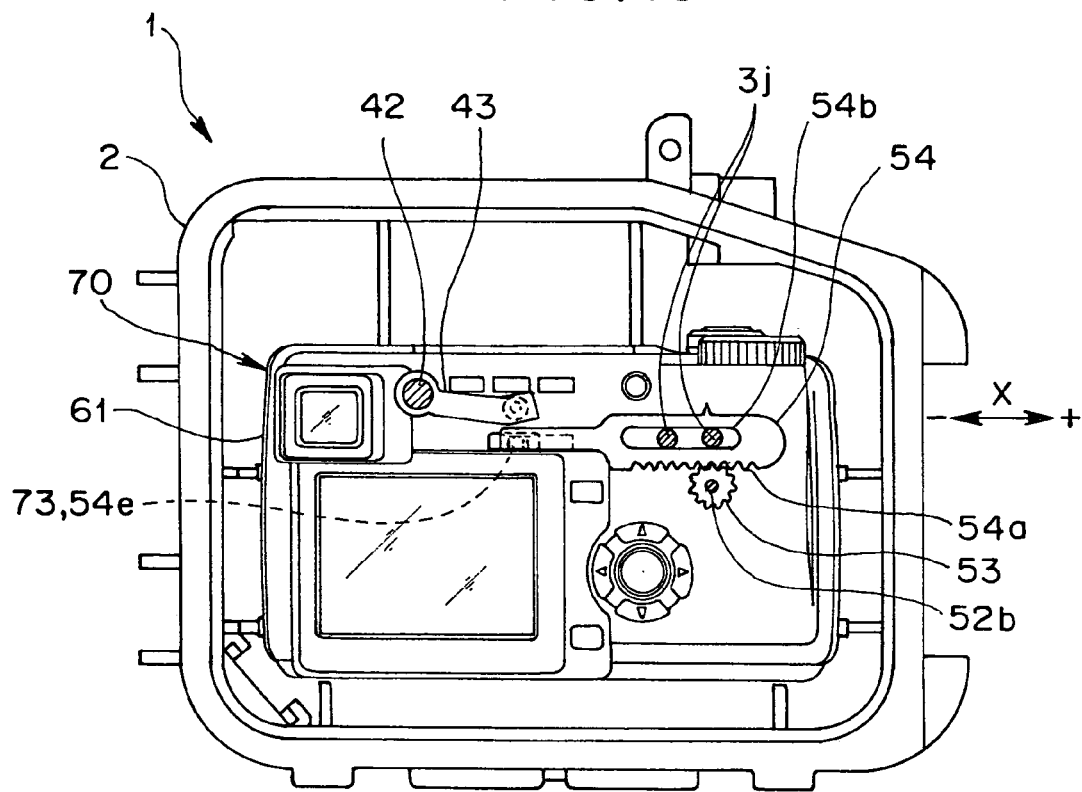
FIG. 13 is a view showing, from the rear side, the storage of the second camera in the waterproof housing shown in FIG. 1 and showing the operation (on-power and play mode) of the power switch using the slide power switch operating portion.
Figure 14:
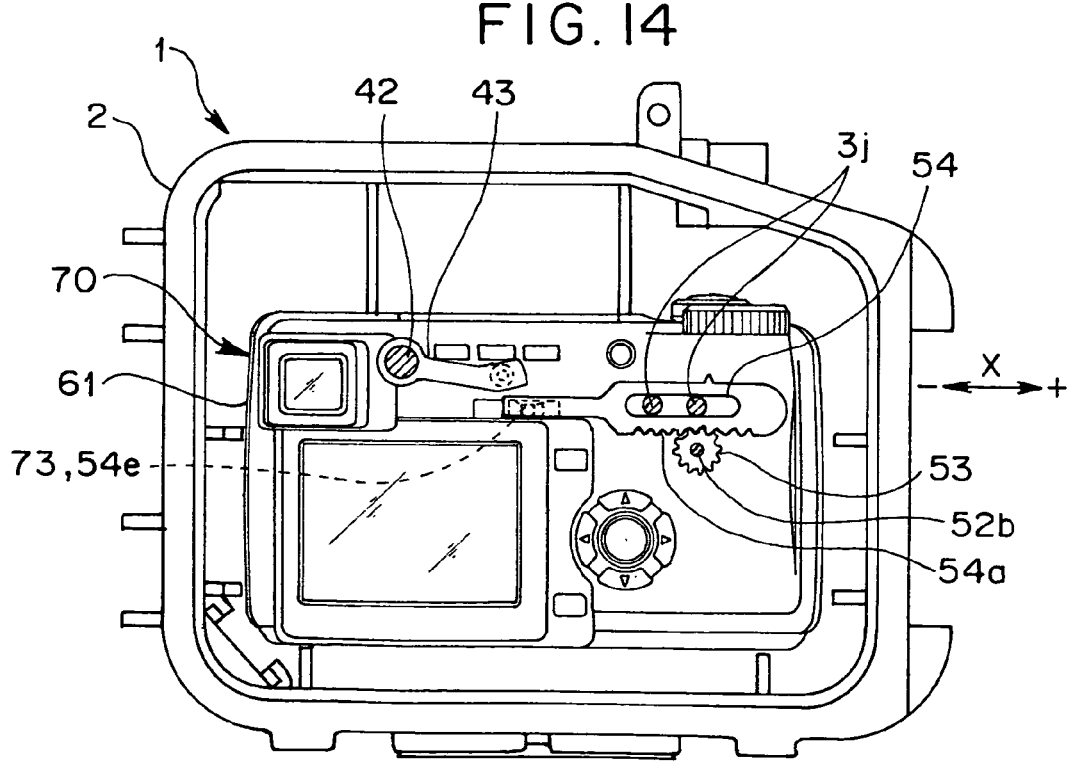
FIG. 14 is a view showing, from the rear side, the storage of the second camera in the waterproof housing shown in FIG. 1 and showing the operation (on-power and still image photographing mode) of the power switch using the slide power switch operating portion.
Figure 15:
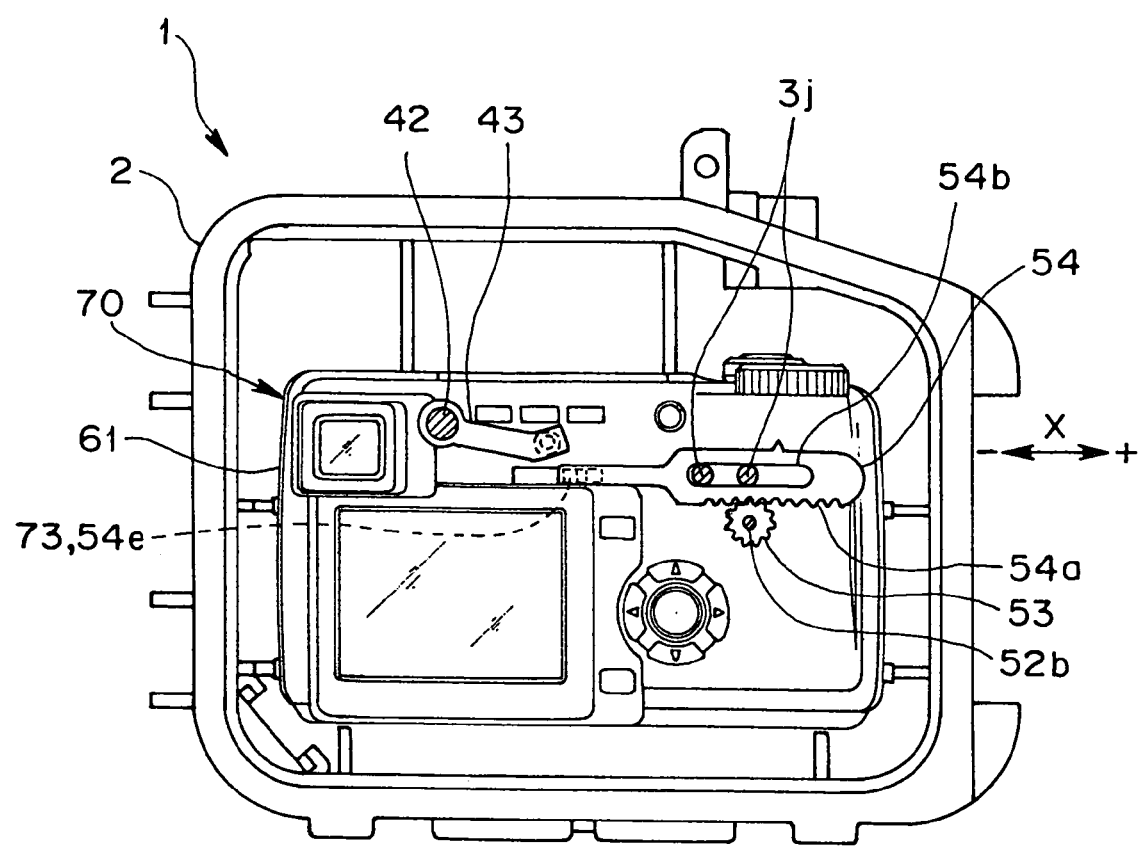
FIG. 15 is a view showing, from the rear side, the storage of the second camera in the waterproof housing shown in FIG. 1 and showing the operation (on-power and moving image photographing mode) of the power switch using the slide power switch operating portion.

Referring to FIG. 12, when the second camera 70 is stored in the waterproof housing 1, the edge of the arm 43 in the power switch operating member 26 is withdrawn to the top position of the power switch knob 73 so as to fit and engage the power switch knob 73 of the stored second camera 70 into the slide knob fitting caved portion 54e of the slide member 54 on the power switch operating member 27 side.

The rotate knob 51 is rotated and the slide member 54 is moved in the (+X)-direction by a predetermined distance. Thus, the slide knob fitting caved portion 54e slides the power switch knob 73 to the fourth position from the first position (refer to FIGS. 12 to 15), and the mode enters an on-camera mode and further is set to various photographing and play modes. That is, when the power switch knob 73 is moved to the second position on the side in the (+X)-direction from the first position, the power switch of the second camera 70 is switched on and the mode is set to the play mode.

Next, the rotate knob 51 is rotated and the slide member 54 is further moved in the (+X)-direction by a predetermined distance. Thus, the power switch knob 73 is slid to the third position from the second position (refer to FIG. 14) and the second camera 70 is set to the still image photographing mode while the power switch is on.

Then, the rotate knob 51 is rotated and the slide member 54 is further moved in the (+X)-direction by a predetermined distance. Thus, the power switch knob 73 is slid to the fourth position from the third position (refer to FIG. 15) and the second camera 70 is set to the moving image photographing mode while the power switch is on.

The rotate knob 51 is inversely rotated and the slide member 54 is returned to the original position as shown in FIG. 12. Thus, the power switch knob 73 is returned to the first position and the power switch of the second camera 70 is switched off.

In the above-mentioned system comprising the waterproof housing and the plurality of cameras which are stored in the waterproof housing according to the embodiment, the different power switch operating members 26 and 27 are integrated in the first camera 60 and second camera 70 having different operating structures of the operating member of the power switch and, thus, the system is operable upon storing the first camera 60 or second camera 70.

When the first camera 60 is stored in the waterproof housing 1 and the power switch operating member 26 is set to be operable, the power switch operating member 27 that is not used is locked by the structure member on the power switch operating member 26 and is held to be non-operated. On the other hand, when the second camera 70 is stored, the power switch operating member 26 that is not used is held to be non-operated by the press button 41 set to the click projected portion 3g. The holding states enable the prevention of the erroneous operation of the power switch operating member 27 or 26.

According to the embodiment, the waterproof housing stores one of the plurality of cameras with the different structures of the power switch operating button and knob.

Further, the present invention can be applied to a waterproof housing which stores one of a plurality of cameras with an operating member of a mode change-over switch and another switches, except for the power switches of the plurality of cameras.

The first camera 60 and the second camera 70 have the substantially same external appearance including the external dimension. The present invention is not limited to this and, further, can be applied to a plurality of cameras having another appearance stored in the waterproof housing.

Having described the preferred embodiments of the invention referring to the accompanying drawings, it should be understood that the present invention is not limited to the those precise embodiments and various changes and modifications thereof could be made by one skilled in the art without departing from the spirit or scope of the invention as defined in the appended claims.

What is claimed is:

1. A system comprising a plurality of cameras and a waterproof housing, the system comprising:
   a first camera comprising a first operating member having a position within the waterproof housing when the first camera is accommodated, in a waterproof manner, in the waterproof housing;
   a second camera comprising a second operating member having a position which is superposed to the position of the first operating member in the waterproof housing when the second camera is accommodated, in a waterproof manner, in the waterproof housing,
   wherein the first and second operating members have different specifications but perform the same operation; and
   the waterproof housing comprising
   a third operating member which operates the first operating member when the first camera is accommodated, in a waterproof manner, in the waterproof housing and
   a fourth operating member which operates the second operating member when the second camera is accommodated, in a waterproof manner, in the waterproof housing.

2. A system comprising a plurality of cameras and a waterproof housing according to claim 1, further comprising:
   locking means which sets the fourth operating member to be inoperable upon operating the third operating member.

3. A system comprising a plurality of cameras and a waterproof housing according to claim 1, wherein when the third operating member is operated, the third operating member is at a locking position for setting the fourth operating member to be inoperable.

4. A system comprising a plurality of cameras and a waterproof housing according to claim 1, wherein the first operating member is a press button and the second operating member is a slide knob.

5. A system comprising a plurality of cameras and a waterproof housing according to claim 2, wherein the first operating member is a press button and the second operating member is a slide knob.

6. A system comprising a plurality of cameras and a waterproof housing according to claim 1, wherein the third operating member is a press member arranged to the waterproof housing, and the fourth operating member is a rotating member which engages a linear movement member which converts the rotation of the rotating member into the linear movement, arranged to the waterproof housing.

7. A system comprising a plurality of cameras and a waterproof housing according to claim 1, further comprising:
   non-operation holding means which is arranged to the waterproof housing and sets the third operating member to be inoperable.

8. A system comprising a plurality of cameras and a waterproof housing according to claim 7, wherein the non-operation holding means is a click device.

9. A system comprising a plurality of cameras and a waterproof housing,
   the plurality of cameras having varied specifications and different types of power-ON switches, and
   the waterproof housing which can arbitrarily accommodate, in a waterproof manner, any one of the plurality of cameras and comprising a single set of mechanical operating members that can operate, mechanically, the different types of power-ON switches of all of the plurality of cameras.

10. A system comprising a plurality of cameras and a waterproof housing,
    the plurality of cameras comprising:
       a first camera comprising a first operating member having a position within the waterproof housing when the first camera is accommodated, in a waterproof manner, in the waterproof housing;
       a second camera comprising a second operating member having a position which is superposed to the position of the first operating member in the waterproof housing when the second camera is accommodated, in a waterproof manner, in the waterproof housing,
    wherein the first and second operating members have different specifications but perform the same operation; and
    the waterproof housing comprising:
       first means which operates the first operating member when the first camera is accommodated, in a waterproof manner, in the waterproof housing; and
       second means which operates the second operating member when the second camera is accommodated, in a waterproof manner, in the waterproof housing.

11. A waterproof housing for camera storage, comprising:
    a single set of mechanical operating members which can arbitrarily operate, mechanically, different types of power-ON switches of any one of a plurality of cameras,
    wherein the waterproof housing can arbitrarily accommodate, in a waterproof manner, any one of the plurality of cameras having different specifications, and different types of power-ON switches.

12. A waterproof housing for camera storage, wherein,
    a first camera comprising a first operating member having a position in the waterproof housing when the first camera is stored, in a waterproof manner, in the waterproof housing and a second camera comprising a second operating member having a position, when the second camera is stored, in a waterproof manner, in the waterproof housing, which is superposed to the position of the first operating member in the waterproof housing, the waterproof housing comprising:
    a third operating member which operates the first operating member button when the waterproof housing stores, in a waterproof manner, the first camera; and
    a fourth operating member which operates the second operating member when the waterproof housing stores, in a waterproof manner, the second camera,
    wherein the first and second operating members have different specifications but perform the same operation.

13. A waterproof housing for camera storage according to claim 12, further comprising:
    locking means which enables the third operating member to set the fourth operating member to be inoperable upon operating the third operating member.

14. A waterproof housing for camera storage according to claim 12, wherein the third operating member is at a locking position for setting the fourth operating member to be inoperable upon operating the third operating member.

15. A waterproof housing for camera storage according to claim 12, wherein the third operating member is a press member which presses a press button as the first operating member, and the fourth operating member operates a slide member which moves a slide knob as the second operating member.

16. A waterproof housing for camera storage according to claim 13, wherein the third operating member is a press member which presses a press button as the first operating member, and the fourth operating member operates a slide member which moves a slide knob as the second operating member.

17. A waterproof housing for camera storage according to claim 16, wherein the third operating member is at a locking position for setting the fourth operating member to be inoperable upon operating the third operating member.

18. A waterproof housing for camera storage according to claim 12, wherein the third operating member is a press member, and
    the fourth operating member is a rotating member which engages a linear movement member which converts the rotation of the rotating member into the linear movement and which slides the second operating member.

19. A waterproof housing for camera storage according to claim 12, further comprising:
    non-operation holding means which sets the third operating member to be inoperable.

20. A waterproof housing for camera storage according to claim 19, wherein the non-operation holding means is a click device.

21. A waterproof housing for camera storage, wherein, a first camera comprising a first operating member having a position, when the first camera is stored, in waterproof manner, in the waterproof housing can be stored and a second camera comprising a second operating member having a position, when the second camera is stored, in a waterproof manner, in the waterproof housing, which is superposed to the position of the first operating member in the waterproof housing, the waterproof housing comprising:
    first means which operates the first operating button member when the waterproof housing stores the first camera; and
    second means which operates the second operating member when the waterproof housing stores the second camera,
    wherein the first and second operating members have different specifications but perform the same operation.

22. The waterproof housing of claim 12 wherein the waterproof housing has a single configuration in which a user can operate both of the first operating member and the second operating member; and
    the waterproof housing comprising
       a third operating member which operates the first operating member upon storing the first camera in the waterproof housing and a fourth operating member which operates the second operating member upon storing the second camera in the waterproof camera.

23. The waterproof housing of claim 12, wherein the third and fourth operating members are externally located on a back cover of the waterproof housing.

24. The waterproof housing of claim 11 further comprising a display window portion for allowing a user to view objects to be photographed.

25. The system of claim 9 wherein the different types of power-ON switches include a slide switch and a press switch.

26. The waterproof housing of claim 11 wherein the different types of power-ON switches include a slide switch and a press switch.

* * * * *